United States Patent [19]

Boyd et al.

[11] 4,079,226

[45] Mar. 14, 1978

[54] RESISTANCE WELDING

[75] Inventors: Vernon Boyd; Keith I. Johnson; Malcolm D. Hannah, all of Cambridge; Timothy J. Jessop, Haverhill, all of England

[73] Assignee: The Welding Institute, Cambridge, England

[21] Appl. No.: 737,793

[22] Filed: Nov. 1, 1976

Related U.S. Application Data

[63] Continuation-in-part of Ser. No. 552,747, Feb. 25, 1975, abandoned.

[30] Foreign Application Priority Data

Aug. 18, 1976 United Kingdom ................ 8467/76

[51] Int. Cl.² ............................................. B23K 11/24
[52] U.S. Cl. .................................. 219/110; 219/117.1
[58] Field of Search ........... 219/108, 110, 109, 117 R; 307/235 R, 235 A, 235 J, 228

[56] References Cited

U.S. PATENT DOCUMENTS

| 2,472,042 | 5/1949 | Davies | 219/110 |
| 3,422,243 | 1/1969 | Meyer | 219/110 |
| 3,575,572 | 4/1971 | Levinge | 219/110 |
| 3,800,119 | 3/1974 | Kuroda et al. | 219/109 |

FOREIGN PATENT DOCUMENTS 1,109,180   4/1968   United Kingdom ................ 219/110

Primary Examiner—J. V. Truhe
Assistant Examiner—Clifford C. Shaw
Attorney, Agent, or Firm—Cushman, Darby & Cushman

[57] ABSTRACT

A method of controlling the duration of a resistance weld in which a preprogrammed AC current is fed to welding electrodes, the program including an abrupt increase in welding current after a predetermined number of cycles so that the weld duration can be extended into the high amplitude portion if the heat input has been insufficient. The voltage across the welding electrodes is monitored, the peak voltage detected, a reference voltage derived by dropping the peak voltage 2 – 20% and the weld terminated when the subsequent peaks fall to the reference voltage.

10 Claims, 1 Drawing Figure

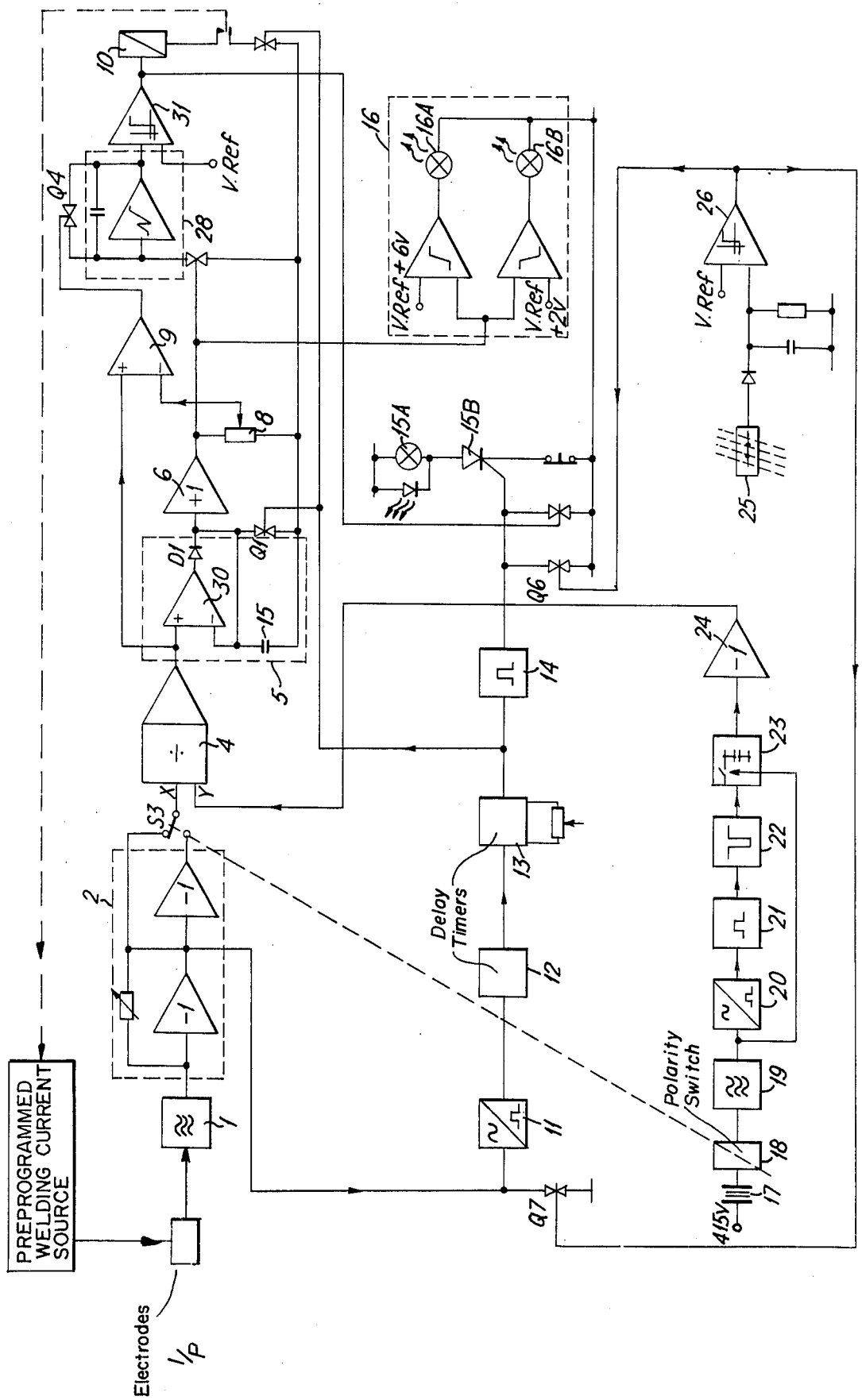

RESISTANCE WELDING

The present application is a continuation-in-part of co-pending application Ser. No. 552,747 filed Feb. 25, 1975, now abandoned.

It has long been recognized that the quality of a resistance weld is critically dependent on the time for which welding current is permitted to pass between the welding electrodes. A common method of controlling the quality of a resistance weld has therefore been to monitor the resistance between the electrodes during a weld and then terminate the welding current when the resistance has fallen by a given percentage from an initial maximum value. Such a system is described, for example, by Van Sciver (Electric Arc and Resistance Welding, A.I.E.E. Conference, Detroit, Michigan, April 1952 pp. 101–111). Although such a control system is feasible in theory, it has not proven easy to produce a system which works in practice. This is partly due to the fact that the voltage drop associated with the change in resistance during a weld is only a small percentage of the total welding voltage and this has made it difficult to detect the voltage drop reliably.

More recently, in a paper by Wellinger and Birkel (Schweissen und Schneiden Vol. 16, No. 7, July 1964 pp. 263–271) it has been suggested that the weld duration could be prolonged until the onset of weld splashing. Although weld splashing is generally undesirable, the abrupt changes associated with the onset of weld splashing are more easily detectable than the more gradual changes which occur before hand so that if the welding current is terminated immediately the weld splashing is detected, a good quality weld will be obtained and only a small amount of metal will be expelled from the weld nugget.

In particular the voltage drop which occurs at the onset of weld splashing is generally an abrupt drop of about 10% to 20% compared to the more gradual proceeding drop of about 5%. Although previous attempts have been made to detect this more abrupt voltage drop the resulting circuits have not proved reliable, particularly when introduced on the shop floor of car assembly plants where interference and pick-up have been a major problem.

In accordance with the present invention a method of controlling the duration of a resistance weld comprises monitoring the voltage across the welding electrodes, detecting and holding the peak voltage to which the monitored voltage rises, dropping the held voltage by a preselected amount to derive a voltage which is at least 2% but not more than 20% lower than the held peak voltage, comparing the subsequent lower peaks of the monitored voltage with the derived voltage, and terminating the weld as soon as the subsequent peaks fall to the level of the said derived voltage.

The derived voltage is preferably 10% to 20% lower than the held peak voltage. By detecting a 10% to 20% voltage drop from the peak level, the aim is to terminate the welding current at a full size weld. In general, under high heat conditions (high welding current) this involves terminating at the onset of weld splashing but applicants have found, for lower welding currents, termination may occur just before weld splashing commences.

For single phase 50 Hz circuits, the reliability of the circuit is further improved if, after the voltage has risen to its peak, a pulse is fed out from the comparator during each subsequent cycle of welding current each time the monitored voltage exceeds the lower voltage level and the termination of the welding current is responsive to the absence of a pulse output from the comparator for a period longer than one cycle of welding current. For example, the pulses from the comparator may reset a ramp generator so that the output from the ramp generator never exceeds a predetermined level unless a pulse fails to arrive after a predetermined time. One advantage of this arrangement is that it prevents inadvertent termination of the welding current due to spurious voltages in the control circuit.

This termination technique cannot be used on three-phase welding machines where the current is no longer 50 Hz but is variable from 5 to 50 Hz. With such a variable frequency it would be necessary to reset the ramp gradient to accommodate the changes in frequency. With a three-phase system, therefore, the monitored electrode voltage is fed to a RMS converter. A first peak detector then senses the peak of the RMS wave-form and holds, and a second peak detector is reset at each peak of the RMS wave-form. When the output of the second peak detector has fallen to a level 10% to 20% below the output of the first peak detector, the welding current is terminated.

Another feature of both single and three-phase circuits is the use of an active low-pass filter to remove unwanted frequencies from the monitored voltage waveform. Although such a filter would not normally be considered necessary in such a circuit, we have discovered that one of the problems with the known circuits has been due to transient voltages getting through to the output, especially when the circuits are used on the shop floor in car assembly plants. With an active filter incorporating operational amplifiers, the circuit has a significantly improved immunity to inductive pick-up and we have found that this leads to greatly improved reliability.

Another cause of unreliability has been the possibility of a drop in the supply voltage being mistaken for a voltage drop associated with the fall in resistance between the electrodes during a weld. A further preferred feature of the present circuit is therefore that the monitored voltage is divided by the supply voltage before the peak voltage is detected such that any supply voltage variations cancel themselves out in the resulting signal.

In order that the invention may be more clearly understood, one example will now be described with reference to the accompanying drawings in which the sole FIGURE is a block diagram of a control circuit for automatically terminating the welding current in a resistance weld.

Referring to the block diagram, a pair of welding electrodes (not shown) are supplied with 50 Hz welding current from a 415/6V power transformer which forms part of the preprogrammed welding current source. The voltage across the electrodes is fed into a steep (50 db/oct) low pass filter 1 which includes an operational amplifier. The filter removes spurious and random switching spikes as well as inductive pick-up in the leads from the welding electrodes. The output from the filter is fed to a variable gain switched inverting amplifier 2 which amplifies the signal sufficiently to ensure reliable operation of the subsequent peak detector 5.

The gain of the amplifier 2 is adjusted so that the peak voltage will always lie within a predetermined range, say 2–6 volts. The adjustment is made before welding commences either using an external oscillograph to observe the output of the buffer amplifier 6 when a reference voltage is applied to the low-pass filter 1 or by feeding the output from the buffer 6 to a window comparator 16 and illuminating one of two lights 16A or 16B whenever the output voltage exceeds 6 volts or falls below 2 volts, respectively.

The invert switch S3 associated with the amplifier 2 permits the control circuit to operate on either incoming positive or negative peaks. Having selected the peak polarity required, the electrode sine volts are then fed to the X input of an electronic divider 4. The Y input of the divider receives a DC voltage proportional to the peak AC supply so that the output of the divider represents the ratio of the voltage across the electrodes and the peak supply voltage. This means that the input to the peak detector 5 is always automatically calibrated against mains fluctuation.

The peak detector 5 includes an operational amplifier 30 with a diode D1 in the feedback loop. The peak value of the sine wave input signal from the mains compensator 4 is fed to the non-inverting input of amplifier 30 and is held as a DC voltage on capacitor 15. It is then brought out through the high impedance buffer amplifier 6 to a potentiometer 8. The potentiometer drops the detected peak voltage by a predetermined amount which is at least 2% but not more than 20%, and this lower voltage is fed from the wiper of the potentiometer to the inverting input of a comparator 9. The non-inverting input of the comparator 9 is fed with the sine wave input from the mains compensator 4 so that each time the sine wave exceeds the set lower voltage a pulse appears at the output of the comparator. The resulting pulses are fed to a transistor switch Q4 connected across a ramp (saw tooth) generator 28 such that each pulse resets the ramp to zero. When the peaks of the incoming sine wave eventually drop to the lower voltage (which may not occur until the onset of weld splashing depending on the level of welding current) the inputs to comparator 9 balance one another, and the resulting absence of an output pulse permits the ramp voltage to continue increasing until it exceeds the reference V REF on a ramp limit comparator 31 and thereby actuates a weld termination relay 10. Actuation of the relay 10 terminates the weld timer (not shown) which controls the flow of welding current through the welding electrodes.

The main capacitor 15 in the peak detector 5 is progressively charged by the positive half cycles of the input voltage to the peak detector. The voltage across the capacitor thus represents, at any time, the peak voltage to which the input has risen, the capacitor being prevented from discharging through potentiometer 8 by the buffer amplifier 6. The capacitor is normally clamped to ground potential through a transistor switch Q1.

The Schmitt trigger 11 fed from the output of the variable gain inverting amplifier 2 operates a 2 cycle delay timer 12 which in turn operates a 1-99 cycle delay timer 13 which ensures that a warning light is ignited after 1-99 cycles of welding current if not terminated by voltage drop. This is achieved by feeding the output of timer 13 to a 100 msec. half shot 14 which detects the end of 1-99 cycle timing sequence and fires thyristor 15B. This illuminates the warning light 15A. The output of timer 13 is also fed to the peak hold reset Q1.

The peak DC voltage which is fed to the Y input of the electronic divider 4 is obtained as follows. The 415 volt primary for the welding machine is fed to a mains transformer 17 and the resulting secondary voltage ($\simeq$6Vrms), is fed through a polarity switch 18 ganged with switch 3 and passed through a 70 Hz low pass filter 19 before being fed to a zero crossing detector 20. The switch is to ensure that positive peaks of welding current occur in phase with positive peaks of the supply, otherwise sample errors manifest themselves. The detector provides 12 volt square waves with fast edges which occur atthe zero of the 50 Hz sinusoidal output. The leading edge triggers a stable 5 msec. timer 21, the negative edge of the timer is adjusted to occur at the peak of the 50 Hz input to the zero crossing detector. This negative edge is then fed into a 50 $\mu$sec half shot timer 22 and this pulse turns on a sample-hold unit 23 for a 50 $\mu$sec sample period at each peak of the 50Hz sinewave. At the same time as this sample pulse occurs, the 50 Hz sine wave peak is applied to the hold capacitor, and this peak voltage then appears at the output of the sample-hold as a DC voltage whose amplitude is up-dated at 20 msec intervals. The peak DC voltage is then inverted by amplifier 24 before being fed to the electronic divider 4.

When weld current is initiated a magnetic proximity switch 25 is energized by the high magnetic field at the electrodes. This operates a comparator 26 and the resulting output performs two functions. Firstly, it is fed to a transistor switch Q7 to enable Schmitt 11 and thus prevents inadvertent initiation of timer 12 by "pick-up" during no weld periods. Secondly, it is fed to transistor switch Q6 to inhibit the thyristor 15 from being fired during the weld.

A squaring circuit (or a circuit which raises to the $n^{th}$ power) may be inserted between the output of the electronic divider 4 and the peak detector 5 in order to increase the sensitivity of the control circuit. Since the relative voltage drop is increasing by squaring the voltage waveform, it may then be possible to reliably detect the more gradual voltage drop which occurs before the onset of splashing so that the weld can be terminated before splashing commences regardless of the value of the welding current.

The preprogrammed welding current source is programmed to include an abrupt increase in amplitude after a predetermined number of cycles have been completed. This predetermined number of cycles is chosen so that the weld nugget has normally grown to its optimum size before the occurrence of the abrupt increase. In resistance welding, the voltage across the welding electrodes falls as the weld nugget grows in size, and the object of the control circuit is to terminate the weld when the nugget has grown to its optimum size. As previously explained, this occurs when the voltage has fallen to a fixed percentage of its peak value. However, if for some reason the weld is unable to reach its optimum size because there is insufficient heat input to the weld, the circuit cannot function however long the weld continues because the voltage across the electrodes will never fall to the required threshold level.

Thus, if there is insufficient heat input to the weld, due, for example, to factors such as electrode wear or a drop in the mains voltage, the weld nugget may not reach its optimum size during the low amplitude portion of the preprogrammed wave form. In this case the weld is automatically continued for a few cycles of the high amplitude portion of the waveform and these high amplitude cycles are able to boost the heat input and thus enable the weld nugget to grow to its optimum size.

Without the abrupt increase in amplitude, this would not be possible and the circuit therefore achieves acceptable welds over a wider range of welding conditions than can be achieved using a constant amplitude current. Moreover, by using an abrupt increase in amplitude rather than a continually increasing current, there is little risk of masking the voltage drop which is being detected to terminate the weld. This would only be masked if it occurred exactly at the point where the current is increased and this problem can easily be overcome by employing a dwell time of approximately 1 cycle duration between the low amplitude portion and the high amplitude portion of the preprogrammed waveform, no welding current being passed during this dwell time.

Although this type of preprogrammed waveform has been used previously in resistance welding, it has always been used for a quite different purpose and the high amplitude portion of the waveform has therefore occurred at the beginning of the normal weld growth period rather than towards the end of this period. Thus, in these previous applications, the low amplitude portion of the preprogrammed current has been used to control the heating of weld components by deliberately limiting the heat generation during the first part of the welding cycle. In particular, in resistance projection welding, the initial low amplitude portion of the current waveform allows the metal projection to heat up and collapse in a controlled manner. Without this low amplitude pulse, excessive heating can occur at the small initial contact area between the projection and the other weld member, and this can lead to undesirable expulsion of molten metal. The high amplitude portion of the current waveform is then applied to grow the weld to its full size.

Where a large number of welds are being made successively, the amount of weld splashing can be even further reduced by using the control circuit to detect the time taken to reach the onset of weld splashing for the first weld and then automatically reducing the weld time so that subsequent welds are terminated just before the onset of weld splashing. Preferably, the control circuit would be operated at regular intervals after a predetermined number of welds have been completed to calibrate the system against variations in the time taken to reach the onset of weld splashing.

What is claimed is:

1. A method of controlling the duration of a resistance weld comprising:
   feeding a preprogrammed AC welding current to the welding electrodes, the programme including an abrupt increase in welding current after a predetermined number of welding current cycles, said predetermined number being selected to ensure that the weld nugget will normally have grown to its optimum size before the occurrence of said abrupt increase,
   monitoring the voltage across the welding electrodes,
   detecting and holding the peak voltage to which the monitored voltage rises,
   dropping the held voltage by a preselected amount to derive a reference voltage which is at least 2% but not more than 20% lower than the held peak voltage,
   continuing to detect the cyclic peaks of the monitored voltage after the monitored voltage has reached its peak value,
   comparing the subsequent cyclic peaks of the monitored voltage with the derived reference voltage,
   terminating the weld as soon as the subsequent peaks fall to the level of the said derived reference voltage, said termination normally occurring during the low amplitude portion of said preprogrammed waveform, and
   extending the duration of the weld into the high amplitude portion of the preprogrammed waveform only in response to a reduced heat input to the weld which would otherwise prevent the weld nugget from reaching its optimum size.

2. A method according to claim 1 in which the derived reference voltage is at least 10% but not more than 20% lower than the held peak voltage.

3. A method according to claim 1 further comprising generating an output pulse each time a subsequent peak of the monitored voltage exceeds said reference derived voltage, and terminating the weld in response to the absence of an output pulse for a period exceeding one cycle of welding current.

4. A method according to claim 3 further comprising generating a ramp waveform, comparing the ramp voltage with a reference voltage, resetting the ramp to zero in response to each output pulse, and terminating the weld whenever the ramp voltage exceeds the reference voltage.

5. A method according to claim 1, in which the monitored voltage is fed through an acitve low-pass filter before the peak voltage is detected.

6. A method according to claim 1 in which the welding current is supplied from a power supply and in which the monitored voltage is divided by the peak supply voltage before the peak monitored voltage is detected.

7. A method of controlling the duration of a resistance weld comprising:
   feeding an AC welding current to the welding electrodes,
   monitoring the voltage across the welding electrodes,
   detecting and holding the peak voltage to which the monitored voltage rises,
   dropping the held voltage by a preselected amount to derive a reference voltage which is at least 2% but not more than 20% lower than the held peak voltage,
   continuing to detect the cyclic peaks of the monitored voltage after the monitored voltage has reached its peak value,
   comparing the subsequent cyclic peaks of the monitored voltage with the derived reference voltage,
   generating an output pulse each time a subsequent peak of the monitored voltage exceeds said reference derived voltage,
   generating a ramp waveform and comparing the ramp voltage with a reference voltage,
   resetting the ramp to zero in response to each of said output pulses, and
   terminating the weld whenever the ramp voltage exceeds said reference voltage.

8. A method according to claim 7 in which said derived reference voltage is at least 10% but not more than 20% lower than the held peak voltage.

9. A method according to claim 7, in which said monitored voltage is fed through an active low-pass filter before said peak voltage is detected.

10. A method according to claim 7, in which the welding current is supplied from a power supply and in which the monitored voltage is divided by the peak supply voltage before the peak monitored voltage is detected.

* * * * *